(12) United States Patent
Dodge

(10) Patent No.: US 9,632,584 B2
(45) Date of Patent: Apr. 25, 2017

(54) ON-DEMAND USER CONTROL

(71) Applicant: QNX Software Systems Limited, Kanata (CA)

(72) Inventor: Danny Thomas Dodge, Ottawa (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 203 days.

(21) Appl. No.: 13/826,582

(22) Filed: Mar. 14, 2013

(65) Prior Publication Data

US 2014/0195905 A1 Jul. 10, 2014

Related U.S. Application Data

(60) Provisional application No. 61/750,210, filed on Jan. 8, 2013.

(51) Int. Cl.
*G06F 3/033* (2013.01)
*G06F 3/01* (2006.01)
*G06F 3/0488* (2013.01)
*G06F 3/0484* (2013.01)

(52) U.S. Cl.
CPC ............. *G06F 3/017* (2013.01); *G06F 3/016* (2013.01); *G06F 3/04847* (2013.01); *G06F 3/04883* (2013.01)

(58) Field of Classification Search
CPC .. G06F 3/04883; G06F 3/04847; G06F 3/016; G06F 3/017; G06F 19/3406; G06F 3/0488; G06F 3/04886; G06F 3/0416; G06F 2203/04808; G06F 3/0481; G06F 3/0485
USPC ................ 715/107, 715, 817, 815, 788, 812
See application file for complete search history.

(56) References Cited

U.S. PATENT DOCUMENTS

| 7,653,883 | B2 * | 1/2010 | Hotelling | G06F 3/0485 715/863 |
| 8,694,910 | B2 * | 4/2014 | Lambourne | G06F 3/0482 715/712 |
| 2006/0026535 | A1 * | 2/2006 | Hotelling et al. | 715/863 |
| 2006/0161870 | A1 | 7/2006 | Hotelling et al. | |
| 2006/0161871 | A1 * | 7/2006 | Hotelling et al. | 715/863 |
| 2007/0236450 | A1 * | 10/2007 | Colgate et al. | 345/156 |
| 2007/0236475 | A1 * | 10/2007 | Wherry | G06F 3/0485 345/173 |

(Continued)

FOREIGN PATENT DOCUMENTS

EP 1 942 101 A1 9/2008

OTHER PUBLICATIONS

European Search Report for corresponding European Application No. 13159138.0, dated May 19, 2014, pp. 1-7.

*Primary Examiner* — Linh K Pham
(74) *Attorney, Agent, or Firm* — Brinks Gilson & Lione

(57) ABSTRACT

A system and method for on-demand user control may detect a user's intend to interact with a currently undisplayed user control. The user's intent may include, for example, a hand approaching a touch-sensitive screen device. In response to the detected intent, the currently undisplayed user control may be displayed. The choice and location of the displayed user control may be derived from a location associated with the detected intent. The user control may be displayed progressively giving the appearance of morphing, emerging or being extruded from the display screen. The user may interact with the displayed user control using, for example, gestures on the touch-sensitive screen device.

27 Claims, 7 Drawing Sheets

(56) References Cited

U.S. PATENT DOCUMENTS

| | | | |
|---|---|---|---|
| 2009/0002368 A1* | 1/2009 | Vitikainen et al. | 345/422 |
| 2009/0061837 A1* | 3/2009 | Chaudhri et al. | 455/418 |
| 2010/0130280 A1* | 5/2010 | Arezina et al. | 463/20 |
| 2011/0001722 A1* | 1/2011 | Newman et al. | 345/174 |
| 2011/0063236 A1* | 3/2011 | Arai et al. | 345/173 |
| 2011/0174926 A1* | 7/2011 | Margis et al. | 244/118.6 |
| 2011/0281619 A1* | 11/2011 | Cho et al. | 455/566 |
| 2012/0218200 A1* | 8/2012 | Glazer | G06F 3/04883 345/173 |
| 2012/0226977 A1 | 9/2012 | Lengeling et al. | |
| 2012/0306790 A1* | 12/2012 | Kyung | G06F 3/016 345/173 |

\* cited by examiner ion. It is intended that all such additional systems, methods, features and advantages be included with this description and be protected by the following claims.
ON-DEMAND USER CONTROL

CROSS-REFERENCE TO RELATED APPLICATIONS

This application claims priority from U.S. Provisional Patent Application Ser. No. 61/750,210, filed Jan. 8, 2013, the entirety of which is incorporated herein by reference.

BACKGROUND

Technical Field

The present disclosure relates to the field of human-machine interfaces. In particular, to a system and method for on-demand user control.

Related Art

Touch-sensitive display devices may be used to provide a human-machine interface (HMI; a.k.a. user interface (UI) or graphical user interface (GUI)) that receives user inputs sensed by the device (e.g., touch gestures on the display surface). The touch-sensitive display devices may represent display content that includes visual metaphors (a.k.a. soft controls; e.g., soft keys) that represent tactile controls (e.g., buttons) that provide visual prompts or enhance familiarity to ease the user's interactions with the HMI.

In some systems the touch-sensitive display device's display area (a.k.a. screen real-estate) is limited due to considerations including: size/portability of the system, bill-of-material (BOM) cost, graphics processing limitations, and other similar factors. In these systems the use of soft controls may be compromised by the desire to include multiple soft controls on the display, each being sufficiently large for ease of user interaction, while also wanting to preserve display area for other visual content and status information.

BRIEF DESCRIPTION OF DRAWINGS

The system and method may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for on-demand user control may detect a user's intent to interact with a currently undisplayed user control. The user's intent may include, for example, a hand approaching a touch-sensitive screen device. In response to the detected intent, the currently undisplayed user control may be displayed. The choice and location of the displayed user control may be derived from a location associated with the detected intent. The user control may be displayed progressively giving the appearance of morphing, emerging or being extruded from the display screen. The user may interact with the displayed user control using, for example, gestures on the touch-sensitive screen device.

Figure 1B:
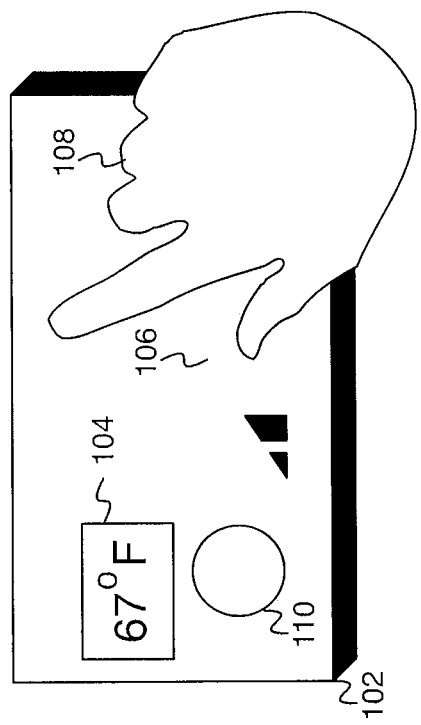
FIGS. 1A-1D are a time series representation of an on-demand user control.
Figure 1D:
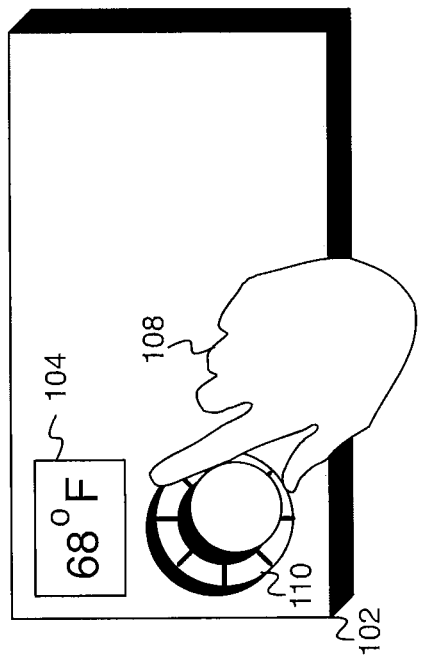
Figure 1A:
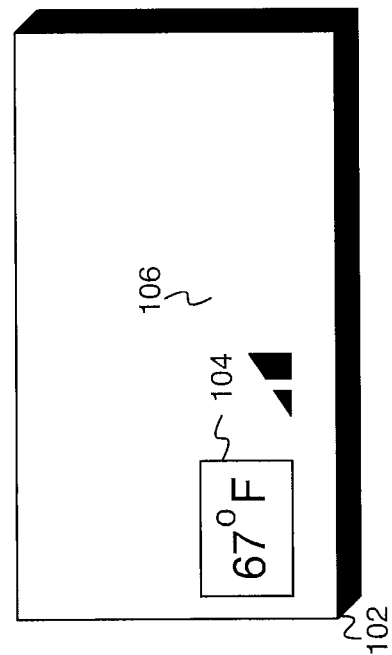

FIGS. 1A-1D are a time series representation of an on-demand user control. FIG. 1A illustrates an example touch-sensitive display device 102 having two visual content elements, a desired temperature 104 and a fan speed setting 106. The touch-sensitive device 102 may be, for example, a component of an infotainment system installed in a vehicle such as an automobile. In FIG. 1B a user's hand 108 is illustrated approaching the touch-sensitive display. A system for on-demand user control may detect a user's intent to interact with a currently undisplayed user control by, for example, detecting the approaching hand of the user 108. In response to detecting the user's intent, the system may begin to display a user control 110. The user control 110 may be a visual representation on the touch-sensitive display device 102 of a tactile (e.g., physical) control element that may be familiar to the user. The user control 110 may take the place of, or displace, an existing visual content element (e.g., the desired temperature 104). Alternatively, the user control 110 may be placed in an area not previously occupied by another visual content element other than a background or other ornamentations.

Figure 1C:
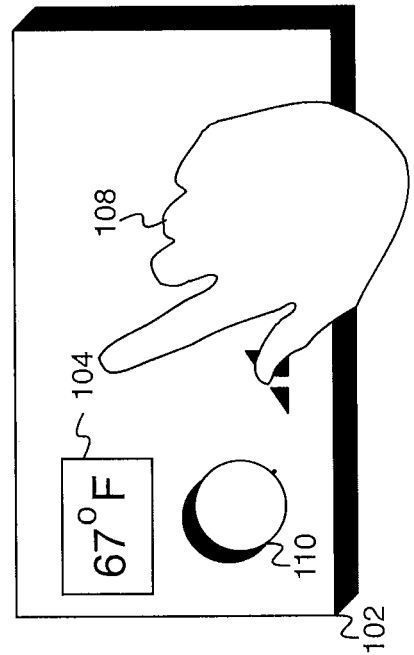

FIG. 1C illustrates the user's hand 108 getting closer to the touch-sensitive display device 102. As the user's hand 108 gets closer the system may display more of the user control 110. The user control 110 may appear to be extruded from the surface of the touch-sensitive display device 102. In FIG. 1D the user's hand 108 is in contact with the surface of the touch-sensitive display device 102 and user control 110 has been rendered into a final desired appearance. The user control 110 may be created by visually transitioning (a.k.a. morphing) from an existing visual content element or background to the final desire appearance for the user control 110. Morphing may include initially applying one or more surface textures from an existing visual content element or background to the user control 110 and then transitioning to one or more final desired surface textures for the user control 110.

Figure 6B:
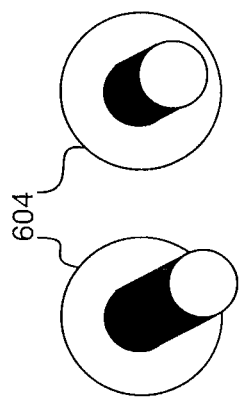
FIG. 6A-6C are schematic representations of further example appearances for a user control.
Figure 6A:
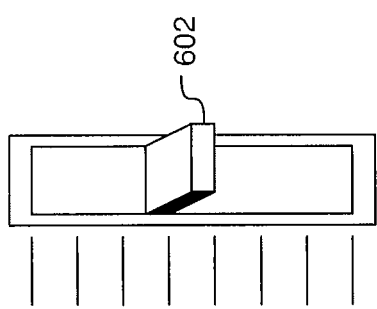
Figure 6C:
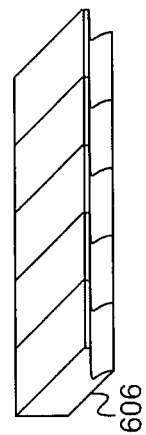
Figure 7:
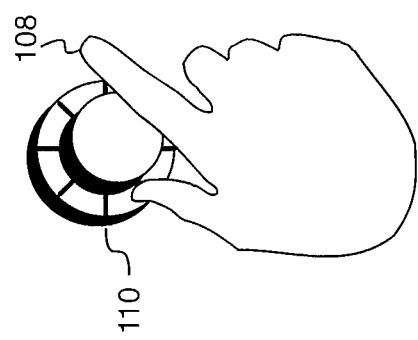
FIG. 7 is a schematic representation of a user's hand interacting with a user control.
Figure 7:
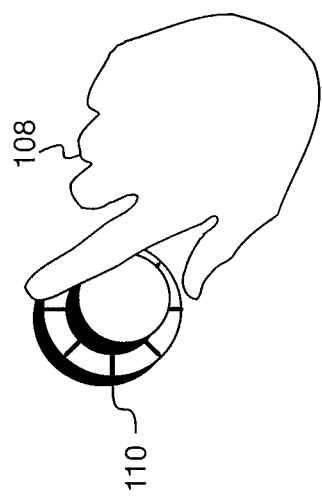

FIG. 7 is a schematic representation of a user's hand 108 interacting with a rotary control type of user control 110. The illustration on the left shows the user's forefinger and thumb proximate the top and bottom, respectively, of the user control 110 (proximate the 12 and 6 o'clock positions using a clock face metaphor). The illustration on the right shows the user's forefinger and thumb after they have transitioned (e.g., rotated) to proximate the 3 and 9 o'clock positions respectively. The interaction of the user with the user control 110 may be characterized as the user control 110 having been turned clockwise a quarter turn or 90 degrees. Alternatively, the interaction may be characterized as the user control 110 having been turned from, for example, the 12 o'clock to the 3 o'clock positions. In a further alternative, the interaction may be characterized as the user control 110 having been turned clockwise (or to the right) by, for example, eight steps for a user control having 32 steps (a.k.a. detents or clicks) per revolution. Similarly, the user's interactions with the other types of user controls, such as those illustrated in FIGS. 5A-5D and 6A-6C and describe below, may be characterized in any way that is appropriate to the type of user control. The interactions with, or operations of, the various types of user controls may be expressed in either relative (e.g., eight steps to the right) or absolute (e.g., turned to the 3 o'clock position) terms as is appropriate for the type of user control being represented. The characterization of the user's interaction with the user control 110 may be sent to other processing elements such as, for example, one or more applications, system software, an operating system or other similar processing elements for further processing.

Figure 2:
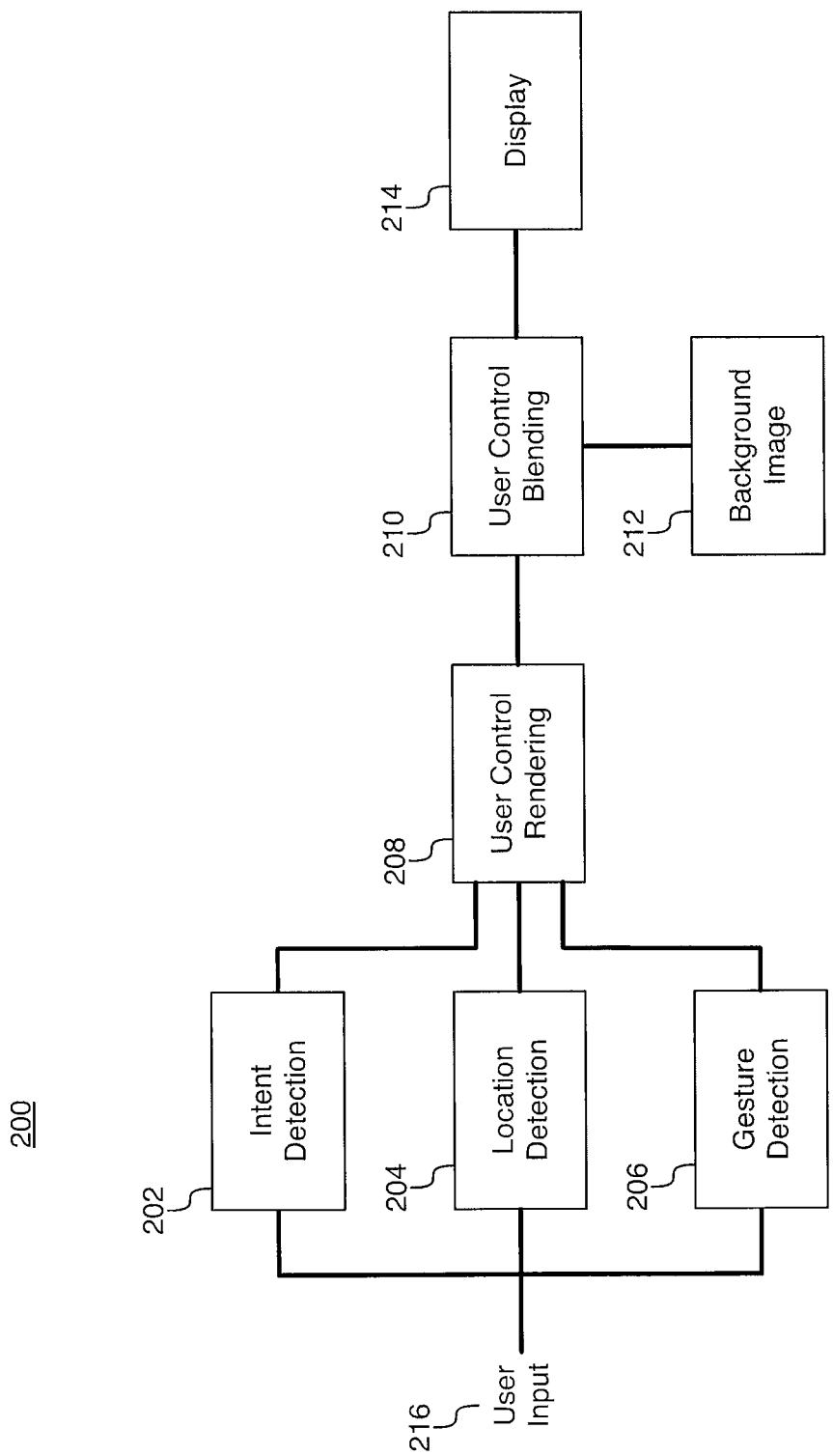
FIG. 2 is a schematic representation of a system for on-demand user control.

FIG. 2 is a schematic representation of functional components of a system for on-demand user control. The example system 200 may comprise functional modules for intent detection 202, location detection 204, gesture detection 206, user control rendering 208 and user control blending 210. The intent detection module 202 may detect a user's intent to interface with a user control 110 by, for example, detecting that the user's hand 108 is approaching a touch sensitive display 214. Alternatively or in addition, the intent detection module 202 may detect that the user's hand 108 is close to (e.g., proximate) or in contact with the display 214. Any mechanism that allows detection of the user's hand 108 in relation to the display 214 including, without limitation, capacitance, thermal, resistive and optical sensing mechanisms may be used to provide user input 216 to the intent detection module 202, the location detection module 204 and the gesture detection module 206. The intent detection module 202 may provide to the user control rendering module 208 any one or more of: an indication that the user's hand 108 has been detected, a position or distance relative to the display 214 and a direction of movement of the user's hand 108 (e.g., approaching the display). The providing of the indications may be event driven, periodic, on-demand or a combination of these.

The location detection module 204 may receive user input 216 as describe above from which a location of the user's hand 108 relative to the display 214 may be determined. The location may be expressed, for example, using Cartesian coordinates (e.g., X,Y) relative to the display 214. The location may be determined to be proximate to a status indicator or information element (e.g., 104 and 106) displayed on the display 214 or proximate to one of one or more designated areas on the display. A user control, of one or more user controls, may be associated with each status indicator, information element and designated area. The determined location and identification of an associated user control may be provided to the user control rendering module 208.

The gesture detection module 206 may receive user input 216 as described above from which a gesture by the user's hand 108 can be determined. The gesture may be interpreted taking into account a type of user control that is displayed approximate the location of the gesture. Different types of gestures may be associated with each type of user control including, for example, one-dimensional translations (e.g., sliding or toggling), two-dimensional translations (e.g., sliding or rotation) and touches (e.g., pressing). The interpreted gesture may be associated with a particular action of the user control such as, for example, turning a knob, toggling a switch or pressing a button. In addition, the interpreted gesture may be associated with relocating, modifying or dismissing the user control. The gesture and/or the associated user control action may be provided to the user control rendering module 208.

The user control rendering module 208 may render a user control (e.g., 110) and provide for having it displayed on the display 214. The user control rendering module 208 may be triggered to render the user control based on one or more indications received from the intent detection module 202. The location for displaying the user control and the type of user control to render may be determined from the location and identification of the user control received from the location detection module 204. Further, animation of the user control (e.g., the appearance of extruding of the control from the display surface, rotating a knob or toggling a switch) may be based on any combination of indications and information received from the intent detection module 202, the location detection module 204 and the gesture detection module 206.

The user control rendering module 208 may cause the rendered user control to be displayed on the display 214. The user control blending module 210 may, optionally, blend the appearance of the user control provided by the user control rendering module 208 with a background image 212 before the user control is displayed on the display 214. The background image 212 may include one or more visual content elements (e.g., the desired temperature 104 or the fan speed setting 106) and/or may include areas represented using surface textures and/or colors. The user control blending module 210 may mix textures and colors of the background image with textures and colors of the rendered user control, may superposition the user control over the background image using alpha blending, or use any other graphics compositing mechanisms. The user control blending module 210 may be used in both displaying and animating the user control on the display 214.

The system 200 optionally may include a mechanism to provide a haptic feedback to the user. The haptic feedback may include, for example, deforming or otherwise modifying the surface of the display 102 or 214 in the area proximate where the user control 110 is displayed such that the user may be able to feel a presence of the user control 110. The haptic feedback mechanism may be integral or external to the display 102 or 214. The haptic feedback may be modified or changed when the user provides a gesture to operate the user control 110. For example, the shape, size and/or location of the haptic feedback may change. Alternatively, or in addition, transient feedback may be provided to simulate detents (clicks), key depressions, key rebounds or control resistance. The haptic feedback mechanism may include, without limitation, piezoelectric, piezo-polymer, vibration generating or any other haptic feedback generating technologies.

FIGS. 5A-5D are schematic representations of example appearances for a user control. FIGS. 6A-6C are schematic representations of further example appearances for a user control. The user control may appears as: a joystick 502, a toggle switch 504, a rotary control (a.k.a. a jog dial or knob) 506, a group of radio buttons 508, a slider 602, a push button 604, or a set of piano keys 606. The example appearances of user controls in FIGS. 5A-5D and 6A-6C are illustrative only and not intended to be limiting in any way. The user control may take on the appearance of any physical control type that lends itself to being visually represented on the display device and interacted with by the user.

Figure 3:
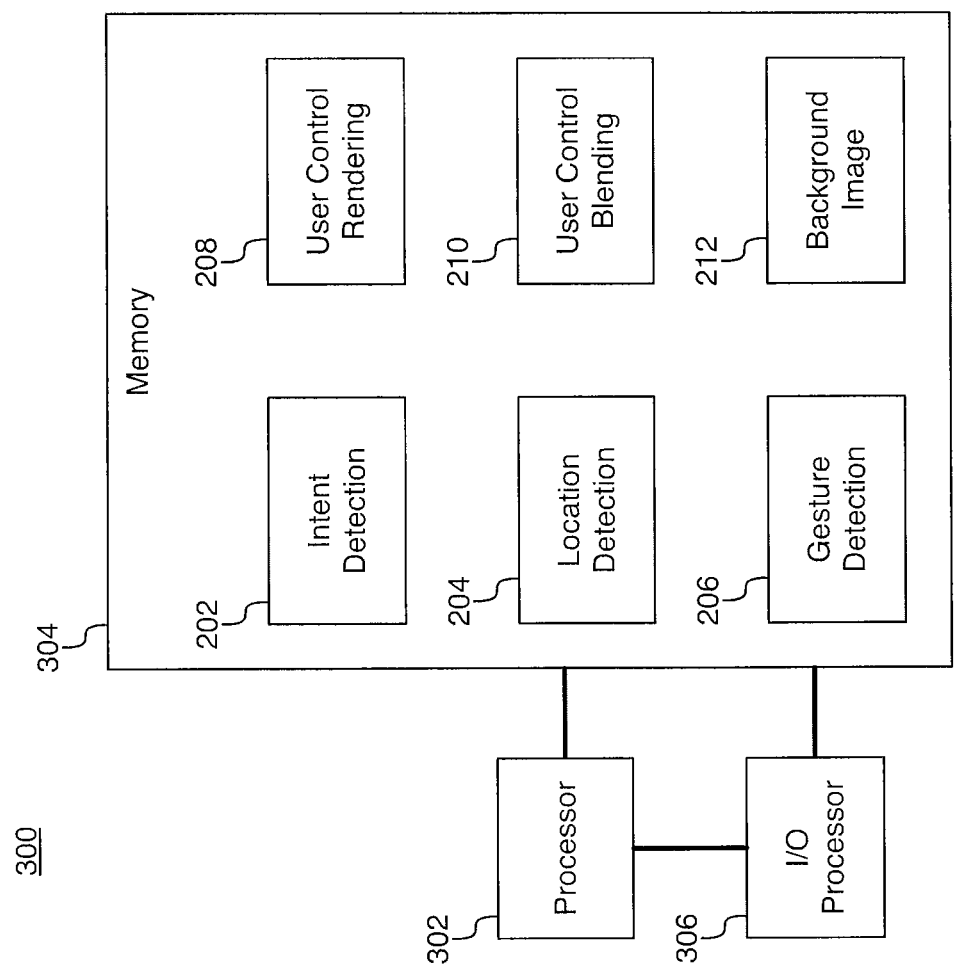
FIG. 3 is a further schematic representation of a system for on-demand user control.
Figure 4:
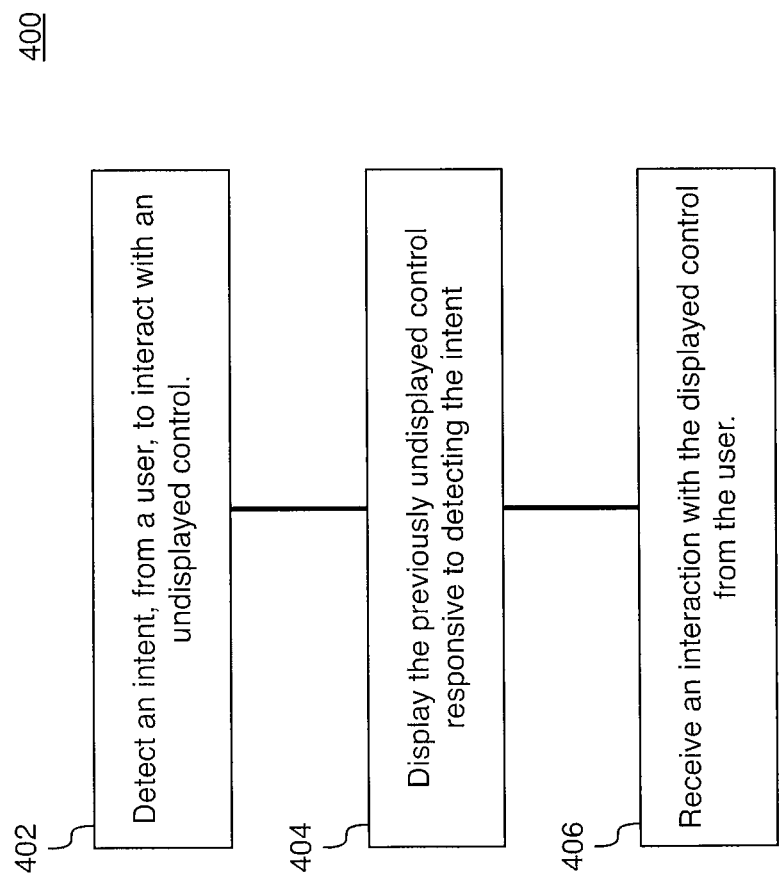
FIG. 4 is a representation of a method for on-demand user control.
Figure 5B:
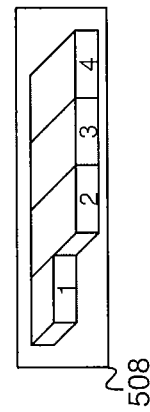
FIG. 5A-5D are schematic representations of example appearances for a user control.
Figure 5D:
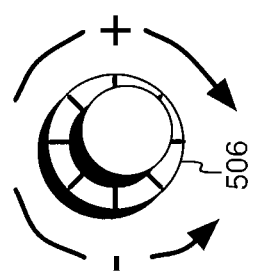
Figure 5A:
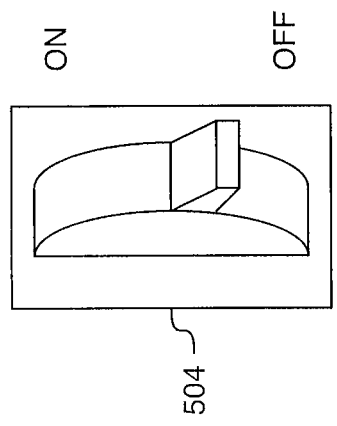
Figure 5C:
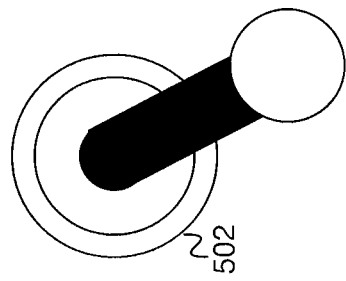

FIG. 4 is a representation of a method for on-demand user control. The method 400 may be, for example, implemented using either of the systems 200 and 300 described herein with reference to FIGS. 2 and 3. The method 400 includes the act of detecting an intent, of a user, to interact with an undisplayed user control 402. Detecting the intent may include detecting that the user's hand 108 is approaching or is proximate to the display 214. Detecting the intent may further comprise determining a location associated with the user's action and associating one of one or more user controls with the determined location. Association of the determined location with one or more user controls may be based on information (e.g., declared regions on the display) provided by a system component or by an application internal or external to the system 200. Alternatively, or in addition, association of the determined location with one or more user controls may be based on a response to query send to interface, system function or application internal or external to the system 200.

The associated user control, which was previously undisplayed, may be displayed responsive to detecting the user's intent 404. The displaying of the user control may be progressive where, for example, the user control appears to emerge from (e.g., be extruded or morphed from) the display 214 in response to the user's hand 108 getting closer to the display 214. When the user control is displayed, an interaction by the user with the displayed control may be received 406. The received interaction may be in the form of a gesture. In response to receiving the user interaction, the display of the user control may be updated to reflect a change in the appearance of the user control resulting from the interaction (e.g., the flipping of a switch or depressing of a button). Further, in response to receiving the user interaction, a command or control operation may be communicated to an application, other components of the system or to another system. The command or control operation may be expressed as a function of the user control type and/or a control function associated with the location of the user control.

FIG. 3 is a further schematic representation of a system for on-demand user control. The system 300 comprises a processor 302, memory 304 (the contents of which are accessible by the processor 302) and an I/O interface 306. The memory 304 may store instructions which when executed using the process 302 may cause the system 300 to render the functionality associated with the intent detection module 202, the location detection module 204, the gesture detection module 206, the user control rendering module 208 and the user control blending module 210 as described herein. In addition the memory 304 may store the background image 212.

The processor 302 may comprise a single processor or multiple processors that may be disposed on a single chip, on multiple devices or distributed over more that one system. The processor 302 may be hardware that executes computer executable instructions or computer code embodied in the memory 304 or in other memory to perform one or more features of the system. The processor 302 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 304 may comprise a device for storing and retrieving data, processor executable instructions, or any combination thereof. The memory 304 may include non-volatile and/or volatile memory, such as a random access memory (RAM), a read-only memory (ROM), an erasable programmable read-only memory (EPROM), or a flash memory. The memory 304 may comprise a single device or multiple devices that may be disposed on one or more dedicated memory devices or on a processor or other similar device. Alternatively or in addition, the memory 304 may include an optical, magnetic (hard-drive) or any other form of data storage device.

The memory 304 may store computer code, such as the intent detection module 202, the location detection module 204, the gesture detection module 206, the user control rendering module 208 and the user control blending module 210 as described herein. The computer code may include instructions executable with the processor 302. The computer code may be written in any computer language, such as C, C++, assembly language, channel program code, and/or any combination of computer languages. The memory 304 may store information in data structures including, for example, the background image 212.

The I/O interface 306 may be used to connect devices such as, for example, a mechanism to detect the user's hand 108, a virtual keyboard interface, touch-sensitive display 102 or 214, and to other components of the system 300.

All of the disclosure, regardless of the particular implementation described, is exemplary in nature, rather than limiting. The systems 200 and 300 may include more, fewer, or different components than illustrated in FIGS. 2 and 3. Furthermore, each one of the components of systems 200 and 300 may include more, fewer, or different elements than is illustrated in FIGS. 2 and 3. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media or non-transitory media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for on-demand user control have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A method for on-demand user control on a system having a display device, the method comprising:
   detecting a user's intent to interact with a displayable control not yet shown on the display device by detecting the user's hand in relation to a touch sensitive display;

selecting the type of displayable control to be rendered on the touch sensitive display device in response to the detection of the user's hand in relation to the touch sensitive display;

displaying, on the touch sensitive display, the selected displayable control at a location on the touch sensitive display in response to detecting the user's intent and the location associated with the detected user's intent, displaying the selected displayable control comprising progressively rendering different portions of the selected displayable control's three dimensional depth in response to the detection of the presence of the user's hand approaching the touch sensitive display of the selected displayable control, a final appearance of the selected displayable control being rendered when a portion of the user's hand is positioned above a portion of the display and at least a portion of the selected displayable control; and receiving an interaction with the selected displayable control from the user;

the appearance of the selected displayable control first rendered on the touch sensitive display is being based on the user's detected intent; and the progressively rendering different portions of the selected displayable control's three dimensional depth corresponding to the changing distance between the user's hand and the selected displayable control; and displaying the selected displayable control further comprising animating the touch sensitive display to cause the selected displayable control to appear to be morphed from a background image.

2. The method for on-demand user control of claim 1, where displaying the selected displayable control further comprises rendering the selected displayable control proximate a predesignated location on the touch sensitive display associated with the detected user's intent and where final appearance is rendered when the user's hand comes in contact with the touch sensitive display.

3. The method for on-demand user control of claim 1, where displaying the selected displayable control further comprises choosing a type of displayable control to display in response to a location, relative to the touch sensitive display device, associated with the detected user's intent.

4. The method for on-demand user control of claim 1, where displaying the selected displayable control further comprises animating the touch sensitive display to cause the selected displayable control to appear to elevate from a surface of the touch sensitive display as the user's hand gets closer to the displayable control and appears tangible when the user's hand comes in contact with the touch sensitive display.

5. The method for on-demand user control of claim 1, where the selected displayable control takes the place of or displaces an existing visual element.

6. The method for on-demand user control of claim 1, where the selected displayable control is a representation of a physical control.

7. The method for on-demand user control of claim 1, wherein progressively rendering different portions of the displayable control comprises rendering the different portions of the displayable control as the user's hand approaches the location of the displayable control such that a final appearance of the displayable control is rendered when the portion of user's hand is in contact with the touch sensitive display.

8. A method for on-demand user control on a system having a display device, the method comprising:

detecting a user's intent to interact with a displayable control not yet shown on the display device by detecting the user's hand in relation to a touch sensitive display;

selecting the type of displayable control to be rendered on the touch sensitive display device in response to the detection of the user's hand in relation to the touch sensitive display;

displaying, on the touch sensitive display device, the selected displayable control at a location on the touch sensitive display in response to detecting the user's intent and the location associated with the detected user's intent, displaying the selected displayable control comprising progressively rendering different portions of the selected displayable control's three dimensional depth in response to the detection of the presence of the user's hand approaching the touch sensitive display of the selected displayable control, a final appearance of the selected displayable control being rendered when a portion of the user's hand is positioned above a portion of the display and at least a portion of the selected displayable control; and receiving an interaction with the selected displayable control from the user to operate the selected displayable control;

providing haptic feedback proximate to the selected displayable control through the touch sensitive display in response to the user's operation of the selected displayable control; the appearance of the selected displayable control first rendered on the touch sensitive display being based on the user's detected intent; and the progressively rendering different portions of the selected displayable control's three dimensional depth corresponding to the changing distance between the user's hand and the selected displayable control.

9. The method for on-demand user control of claim 8, where the haptic feedback is modified in response to the use of the selected displayable control and the method provides a transient feedback that simulates the audio detents, audio clicks, or sounds associated with a physical control that the displayable control represents as the user operates the displayable control.

10. The method for on-demand user control of claim 9, where the interaction is characterized responsive to a gesture made by the user and a type of control associated with the selected displayable control.

11. The method for on-demand user control of claim 10, further comprising sending the characterization of the interaction to one or more other processing elements.

12. The method for on-demand user control of claim 1, further comprising updating the selected displayable control to reflect a change in appearance of the displayable control responsive to the received interaction.

13. A system for on-demand user control comprising: a display device having a touch sensitive screen;

one or more processors; and a memory containing instructions executable by the one or more processors to configure the system to:

detect a user's intent to interact with a displayable control not shown on the display device by detecting the user's hand in relation to a display the touch sensitive screen without physical contact with the touch sensitive screen;

select a type of displayable control to be rendered on the display device in response to the detection of the user's hand in relation to the touch sensitive screen of the display device;

display the displayable control at a location on the touch sensitive screen of the display device in response to detecting the user's intent and a location associated with the detected user's intent, the display of the displayable control on the touch sensitive screen of the display device comprisg progressively rendering different portions of the displayable control's three dimensional depth in response to the changing distance between the user's hand and the displayable control as the user's hand gets closer to the location of the displayabled control, a final appearance of the displayable control appears as a single tangible control and is rendered when a portion of the user's hand is positioned directly above the touch sensitive screen that directly overlies at least a portion of the displayable control;

display the displayable control through an animation that causes the displayable control to appear to be morphed from a background image; and receive an interaction with the displayable control from the user; the appearance of the display control first rendered on the touch sensitive screen being based on the user's detected intent.

14. The system for on-demand user control of claim 13, where the
instructions executable by the one or more processors further configures the system to display the displayable control proximate a predesignated location on the touch sensitive screen display associated with the detected user's intent.

15. The system for on-demand user control of claim 13, where the
instructions executable by the one or more processors further configures the system to select a type of display control to display in response to a location associated with the detected intent.

16. The system for on-demand user control of claim 13, where the
instructions executable by the one or more processors further configures the system to display the displayable control through the animation that further causes the displayable control to appear to be extruding from a surface of the touch sensitive screen as the user's hand gets closer to the displayable control and reaches a full elevation when the user's hand comes in contact with the device touch sensitive screen.

17. The system for on-demand user control of claim 13, where the
displayable control takes the place of or displaces an existing visual element.

18. The system for on-demand user control of claim 13, where the
displayable control is a representation of a physical control that simulates and renders the sounds that a physical control generates when operated by the user.

19. The system for on-demand user control of claim 13, where the
instructions executable by the one or more processors further configures the system to provide haptic feedback proximate to the displayable control and through the touch sensitive screen causing the user to feel a presence of the displayable control.

20. The system for on-demand user control of claim 19, where the haptic feedback is modified in response to a received interaction with the displayable control.

21. The system for on-demand user control of claim 20, where the interaction occurs in response to a gesture made by the user and a type of control associated with the displayable control.

22. The system for on-demand user control of claim 21, where the
instructions executable by the one or more processors further configures the system to send the characterization of the interaction to one or more other processing elements.

23. The system for on-demand user control of claim 13, where the
instructions executable by the one or more processors further configures the system to update the displayable control to reflect a change in appearance of the displayable control in response to the received interaction.

24. The system for on-demand user control of claim 13, wherein
progressively rendering different portions of the displayable control comprises rendering the different portions of the displayable control as the user's hand approaches the location of the displayable control such that a final appearance of the displayable control is rendered when the
portion of user's hand is in contact with the touch sensitive screen.

25. A non-transitory computer readable medium storing a program that provides on demand user control of a system through a display device comprising:
computer program code that detects a user's intent to interact with a displayable control not yet shown on the display device by detecting a presence of a user's hand in relation to a touch sensitive display;
computer program code that detects the selection of a type of displayable control to be rendered on the touch sensitive display in response to the detection of the presence of the user's hand in relation to the touch sensitive display; and
computer program code that displays, on the touch sensitive display, the displayable control at a location on the touch sensitive display in response to detection of the user's intent and the location associated with the detected user's intent, the display of the displayable control rendering the displayable control in two dimensions and then render the displayable control in three dimensions in response to the detection of the presence of the user's hand approaching the touch sensitive display of the displayable control, a final three dimensional appearance of the displayable control being rendered when a portion of the user's hand is positioned above a portion of the touch sensitive display and at least a portion of the displayable control;
where the computer program code transforms the displayable control displayable in two dimensions to three dimensions in response to a corresponding distance between the user's hand and the displayable control; and
where the computer program code animates the touch sensitive display to cause the displayable control to appear to be morphed from a background image.

26. A non-transitory computer readable medium storing a program that provides on-demand user control of a system through a display device comprising:

computer program code that detects a user's intent to interact with a displayable control not yet shown on the display device by detecting a presence of a user's hand in relation to a touch sensitive display;

computer program code that detects the selection of a type of displayable control to be rendered on the touch sensitive display in response to the detection of the presence of the user's hand in relation to the touch sensitive display; and computer program code that displays, on the touch sensitive display, the displayable control at a location on the touch sensitive display in response to detection of the user's intent and the location associated with the detected user's intent, the display of the displayable control rendering the displayable control in two dimensions and then rendering the displayable control in three dimensions in response to the detection of the presence of the user's hand approaching the touch sensitive display of the displayable control, a final three dimensional appearance of the displayable control being rendered when a portion of the user's hand is positioned above a portion of the touch sensitive display and at least a portion of the displayable control;

where the computer program code transforms the displayable control displayable in two dimensions to three dimensions in response to a corresponding distance between the user's hand and the displayable control; and where the computer program code provides haptic feedback proximate to the displayable control through the touch sensitive display in response to the user's operation of the displayable control.

27. A system for on-demand user control comprising: a display device having a touch sensitive screen;

one or more processors; and a memory containing instructions executable by the one or more processors to configure the system to:

detect a user's intent to interact with a displayable control not shown on the display device by detecting the user's hand in relation to the touch sensitive screen without physical contact with the touch sensitive screen;

select a type of displayable control to be rendered on the display device in response to the detection of the user's hand in relation to the touch sensitive screen of the display device;

display the displayable control at a location on the touch sensitive screen of the display device in response to detecting the user's intent and a location associated with the detected user's intent, the display of the displayable control on the touch sensitive screen of the display device comprising progressively rendering different portions of the displayable control's three dimensional depth in response to the changing distance between the user's hand and the displayable control as the user's hand gets closer to the location of the displayabled control, a final appearance of the displayable control appears as a single tangible control and is rendered when a portion of the user's hand is positioned directly above the touch sensitive screen that directly overlies at least a portion of the displayable control;

receive an interaction with the displayable control from the user; the appearance of the display control first rendered on the touch sensitive screen being based on the user's detected intent; and provide haptic feedback proximate to the displayable control through the touch sensitive screen in response to the user's interaction with the displayable control.

* * * * *